United States Patent [19]
Takatu et al.

[11] Patent Number: 5,495,362
[45] Date of Patent: Feb. 27, 1996

[54] PHOTOPERIODIC CIRCUIT AMPLIFICATION CONTROL APPARATUS

[75] Inventors: Tatuhiko Takatu, Tokyo; Kazuo Aida, Yokohama; Kiyoshi Nakagawa, Miura, all of Japan

[73] Assignees: Ando Electric Co., Ltd.; Nippon Telegraph and Telephone Corporation, both of Tokyo, Japan

[21] Appl. No.: 417,675

[22] Filed: Apr. 6, 1995

[30] Foreign Application Priority Data

Apr. 13, 1994 [JP] Japan .................. 6-075188
May 12, 1994 [JP] Japan .................. 6-098966

[51] Int. Cl.⁶ .................................. H01S 3/00
[52] U.S. Cl. .............. 359/333; 359/341; 359/107
[58] Field of Search .................... 359/337, 341, 359/347, 348, 333, 107, 184; 385/14, 42

[56] References Cited

U.S. PATENT DOCUMENTS

| | | | |
|---|---|---|---|
| 4,738,503 | 4/1988 | Desurvire et al. | 350/96.15 |
| 4,923,266 | 5/1990 | Bovet et al. | 350/96.15 |
| 5,155,779 | 10/1992 | Avramopoulos et al. | 385/24 |
| 5,268,786 | 12/1993 | Matsushita et al. | 359/341 |
| 5,291,326 | 3/1994 | Heidemann | 359/160 |
| 5,374,973 | 12/1994 | Maxham et al. | 359/341 |

*Primary Examiner*—Mark Hellner
*Attorney, Agent, or Firm*—Finnegan, Henderson, Farabow, Garrett & Dunner

[57] ABSTRACT

The object of the present invention is to control the amplification rate of a photoperiodic circuit by stable negative feedback control, thereby suppressing fluctuations in the circulating light in the photoperiodic circuit. The circulating light in the photoperiodic circuit is converted into an electrical signal, indicating the intensity of the circulating light, which is held in a first sample-and-hold circuit. Additionally, an electrical signal indicating the intensity of circulating light of the circuit previous to that of the first sample-and-hold circuit is held in a second sample-and-hold circuit. The difference in the value between the electrical signals which indicate intensities of the circulating light are determined by a subtraction circuit. The result is supplied to an addition circuit through a third sample-and-hold circuit. The addition circuit adds the output of the third sample-and-hold circuit with the output of a standard electrical power source, and the result is supplied to an excitation light source. The excitation light source supplies excitation light, having an intensity dependent upon the above-mentioned addition result, to a rare-earth-doped fiber.

10 Claims, 14 Drawing Sheets

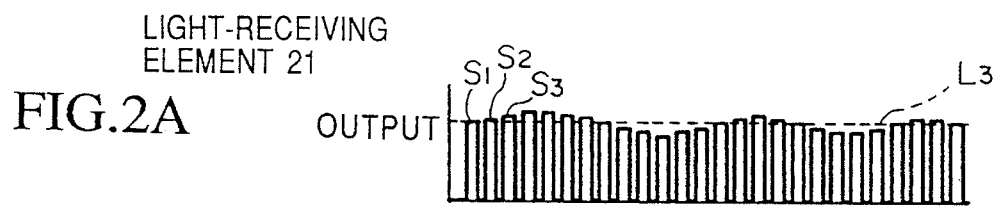

FIG.2A LIGHT-RECEIVING ELEMENT 21 OUTPUT

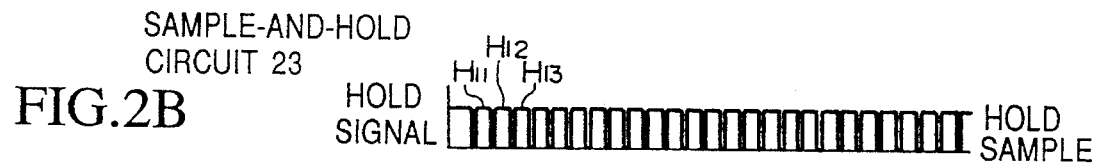

FIG.2B SAMPLE-AND-HOLD CIRCUIT 23 HOLD SIGNAL / HOLD SAMPLE

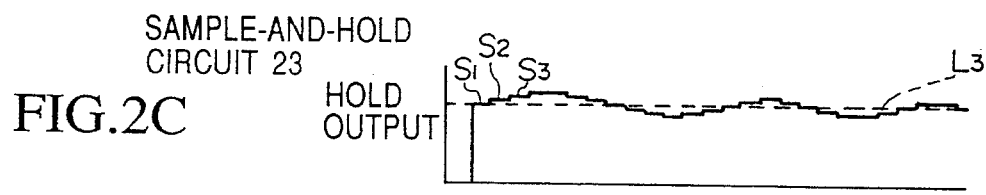

FIG.2C SAMPLE-AND-HOLD CIRCUIT 23 HOLD OUTPUT

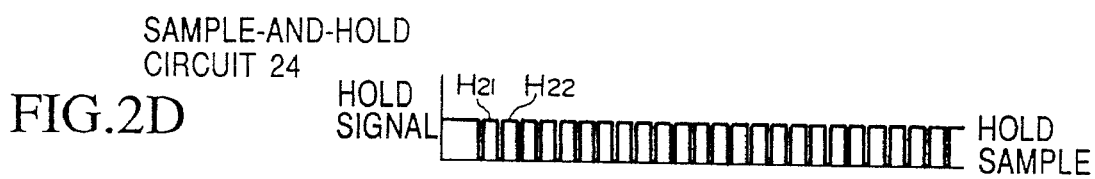

FIG.2D SAMPLE-AND-HOLD CIRCUIT 24 HOLD SIGNAL / HOLD SAMPLE

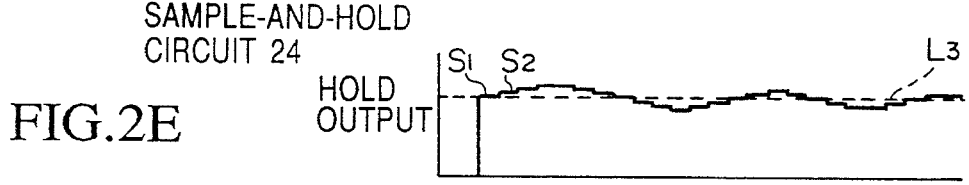

FIG.2E SAMPLE-AND-HOLD CIRCUIT 24 HOLD OUTPUT

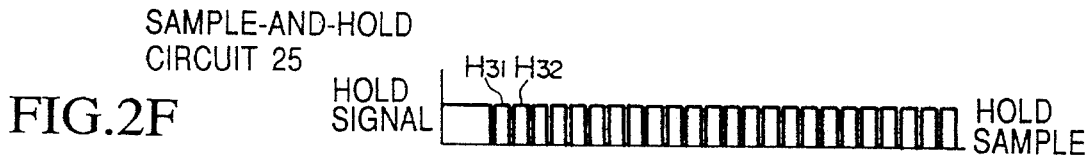

FIG.2F SAMPLE-AND-HOLD CIRCUIT 25 HOLD SIGNAL / HOLD SAMPLE

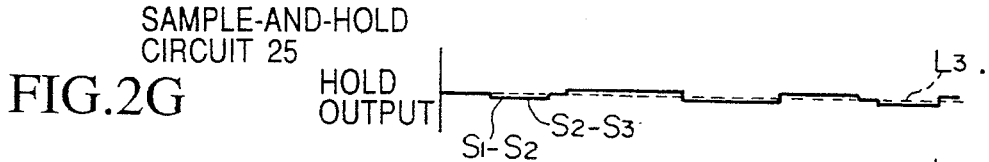

FIG.2G SAMPLE-AND-HOLD CIRCUIT 25 HOLD OUTPUT

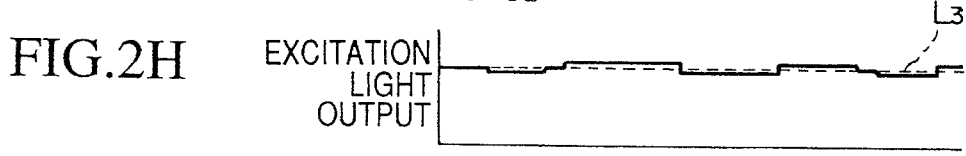

FIG.2H EXCITATION LIGHT OUTPUT

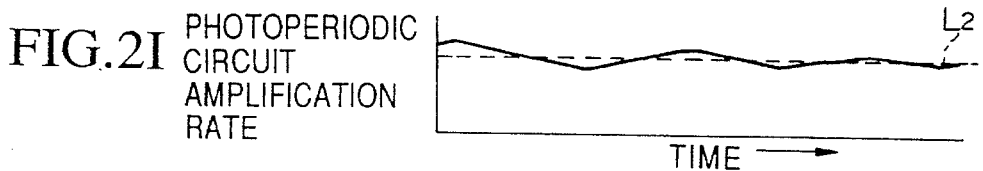

FIG.2I PHOTOPERIODIC CIRCUIT AMPLIFICATION RATE

TIME →

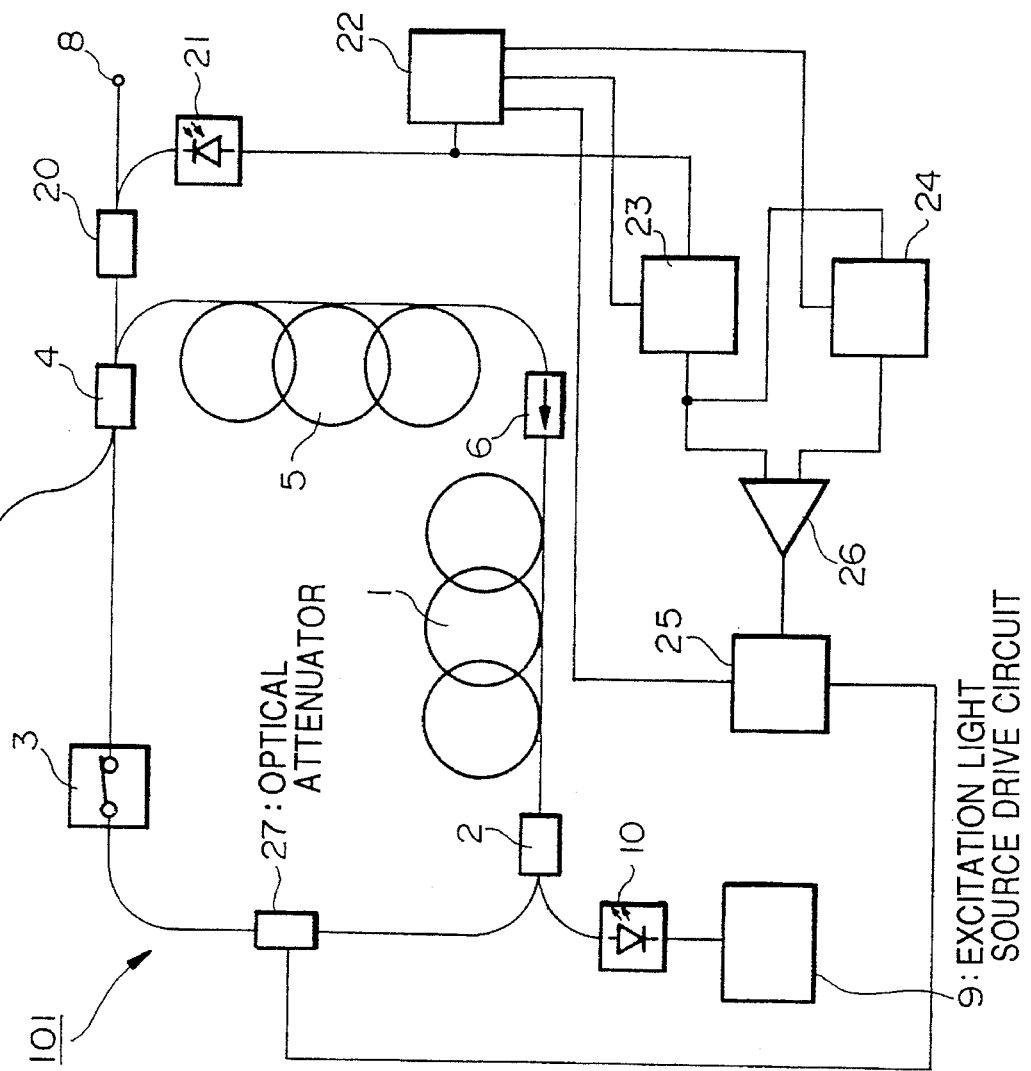

PHOTOPERIODIC CIRCUIT AMPLIFICATION CONTROL APPARATUS

BACKGROUND OF THE INVENTION

1. Technical Field

The present invention relates to photoperiodic circuit control apparatus for stabilizing the amplification in photoperiodic circuits.

2. Background Art

FIG. 7 shows a conventional photoperiodic circuit. In this diagram, the photoperiodic circuit 103 comprises a rare-earth-doped fiber 1, a wavelength multiplexing light mixer/divider 2, an optical switch 3, an light divider 4, a delay fiber 5, an optical isolator 6, a beam input end 7 and a beam output end 8. The excitation light source drive circuit 9 drives the excitation light source 10 so that the excitation light source 10 outputs a beam having a constant intensity.

Then, if an optical signal is inputted into the beam input end 7, then the optical signal becomes periodic, and circulates around the photoperiodic circuit in the following order: light divider 4→delay fiber 5→optical isolator 6→rare-earth-doped fiber 1→wavelength multiplexing light mixer/divider 2→optical switch 3→light divider 4. Additionally, while the light is circulating around the photoperiodic circuit 103, a portion of this circulating light is outputted to the beam output end 8 through the light divider 4. The pulse width of the above-mentioned optical signal is shorter than the time required for one circuit (the period).

In this case, the time from the point at which the inputted optical signal begins to circulate until the time at which the next inputted optical signal begins to circulate is called the frame period. The delay fiber 5 is provided in order to perform this type of time adjustment. When the photoperiodic circuit 103 is cut off by the optical switch 3, the light circulating in the photoperiodic circuit stops circulating.

If the amplification rate of the circulating light due to the rare-earth-doped fiber 1 is equal to the attenuation rate of the circulating light due to the circulation around the photoperiodic circuit, then the light circulating in the photoperiodic circuit continues to circulate at a constant intensity. However, the amplification rate of the rare-earth-doped fiber 1 varies according to the intensity of the circulating light.

The reason that the amplification rate of the rare-earth-doped fiber 1 varies according to the intensity of the circulating light is explained below. FIG. 8 is a diagram showing an optical amplifier using a rare-earth-doped fiber 1 for the case in which the intensity of the excitation light is constant. The rare-earth-doped fiber 1 converts and accumulates the excitation light outputted from the excitation light source 10, and goes into an excited state. Then, if an optical signal is inputted from the beam input end 11, the rare-earth-doped fiber 1 which is in an excited state converts the accumulated excitation energy into an optical signal having the same wavelength as the inputted optical signal. Furthermore, by releasing the converted optical signal, the rare-earth-doped fiber 1 amplifies the inputted optical signal. The amplification rate of the rare-earth-doped fiber 1 depends upon the amount of accumulated energy.

Therefore, if an optical signal with a waveform as shown in FIG. 9A is inputted to the ram-earth-doped fiber 1 excited by excitation light of a constant intensity through the light input end 11, the output obtained at the light output end 12 has a waveform as shown in FIG. 9B. From the outputted waveform shown in FIG. 9B, it is apparent that directly after the optical signal is inputted, there is a momentary increase in the optical amplification rate of the rare-earth-doped fiber. This phenomenon arises because, before the optical signal is inputted, the excitation light inputted from the excitation light source 10, converted to excitation energy remains unused, and therefore accumulates within the rare-earth-doped fiber 1.

Then, as shown in FIG. 9B, after the momentary increase in the optical signal outputted from the rare-earth-doped fiber 1, the intensity of said optical signal begins to decline, and eventually a constant output signal remains. This is because the excitation energy used by the rare-earth-doped fiber 1 is greater than the energy of the excitation light received from the excitation light source 10, and consequently the amplification rate of the rare-earth-doped fiber 1 gradually decreases. Then, as the amplification rate of the rare-earth-doped fiber 1 decreases, the intensity of the optical signal outputted by the rare-earth-doped fiber 1 decreases, and the amount of excitation energy used by the rare-earth-doped fiber 1 becomes low.

Then, when the amount of energy from the excitation light supplied by the excitation light source 10 matches the amount of excitation energy used up by the amplification, the amount of excitation energy accumulated within the rare-earth-doped fiber 1 becomes constant. The amplification rate of the rare-earth-doped fiber 1 depends upon the amount of excitation energy within the rare-earth-doped fiber 1. As a result, when the amount of excitation energy accumulated within the rare-earth-doped fiber becomes constant, the amplification rate of the rare-earth-doped fiber becomes constant as well. The amount of time required for the amplification rate of the rare-earth-doped fiber 1 to become constant may vary from a few microseconds to a few milliseconds.

Next, the variation in the intensity of the light circulating in the photoperiodic circuit 103 shown in FIG. 7 will be explained with reference to FIGS. 10A–10D.

FIG. 10A: If the intensity of the excitation light inputted to the rare-earth-doped fiber 1 is weak, then the amplification rate of the photoperiodic circuit 103 does not exceed "1". Therefore, the intensity of the circulating light is attenuated according to the number of circuits made by the light circulating within the photoperiodic circuit 103.

FIG. 10B: As the output of the excitation light source drive circuit 9 is increased, the intensity of the excitation light supplied to the rare-earth-doped fiber 1 increases, and the intensity of the circulating light begins to fluctuate. Then, the intensity of the circulating light is attenuated as it repeatedly goes up and down.

FIG. 10C: As the intensity of the excitation light in the rare-earth-doped fiber further increases, the circulating light continues to circulate while repeating mild fluctuations.

FIG. 10D: If a pulse train of optical signals is inputted to an optical amplification circuit (shown in FIG. 5) which does not have a photoperiodic circuit, then circulating light as shown in FIG. 7D is outputted.

Next, the reason that the intensity of the light circulating in the photoperiodic circuit shown in FIG. 7 fluctuates as shown in FIG. 10C will be explained with reference to FIG. 11. The dotted line L1 shown in FIG. 11A describes the intensity of the circulating light when the excitation energy accumulated in the rare-earth-doped fiber 1 and the excitation energy used by the rare-earth-doped fiber 1 are equal. When the excitation energy accumulated in the rare-earth-doped fiber 1 and the excitation energy used by the rare-earth-doped fiber become equal, the amplification rate of the photoperiodic circuit 103 becomes "1". Additionally, the dotted line $L_2$ in FIG. 11B describes the amplification rate of the photoperiodic circuit when it is constant at "1".

First, when the photoperiodic circuit 103 is cut off by the optical switch 3, the circulating light is turned off, and the circulation activity of the present circulating light ends. Afterwards, until the photoperiodic circuit 103 is reconnected by the optical switch 3 and the next optical signal is inputted, no optical signal is inputted to the rare-earth-doped fiber 1. However, even in the state in which no optical signal is inputted, excitation light is still being transmitted from the excitation light source 10, so the rare-earth-doped fiber continues to convert and store excitation energy. As the rare-earth-doped fiber 1 continues to convert and store the excitation energy, the amplification rate of the photoperiodic circuit 103 increases (Time A in FIG. 11). As a result, by the time the next optical signal is inputted from the light input end 7, the amplification rate of the photoperiodic circuit 103 is greater than "1" (Time B in FIG. 11). Because the amplification rate of the photoperiodic circuit is greater than "1", the intensity of the circulating light increases each time the circulating light completes a circuit (Time C in FIG. 11). However, since the excitation light transmitted from the excitation light source 10 to the rare-earth-doped fiber 1 is constant, the excitation energy expended by the rare-earth-doped fiber for the amplification of the circulating light is greater than the excitation energy newly generated from the excitation light. Therefore, at time C in FIG. 11A, the intensity of the circulating light increases, but the amplification rate of the photoperiodic circuit 103 decreases.

When the amplification rate of the photoperiodic circuit 103 becomes less than "1", the intensity of the circulating light begins to be attenuated (Time D in FIG. 11). However, since the intensity of the circulating light is above the dotted line $L_1$, the excitation energy used for the amplification of the circulating light is greater than the excitation energy generated from the excitation light. Consequently, the decrease in the amplification rate of the photoperiodic circuit 103 continues (Time E in FIG. 11). Eventually, when the intensity of the excitation light goes below the dotted line $L_1$, the excitation energy used for the amplification of the circulating light becomes smaller than the excitation energy generated from the excitation light. As a result, the amplification rate of the photoperiodic circuit 103 begins to increase (Time F in FIG. 11). However, since the amplification rate of the photoperiodic circuit 103 remains below "1", the intensity of the circulating light continues to decrease (Time G in FIG. 11). Then, when the amplification rate of the photoperiodic circuit exceeds "1", the intensity of the circulating light begins to increase. At this time, since the intensity of the circulating light is not above the dotted line $L_1$, the amplification rate of the photoperiodic circuit 103 continues to increase (Time I in FIG. 11).

As explained above, the intensity of the circulating light and the amplification of the photoperiodic circuit 103 am mutually influenced by each other. Specifically, while the intensity of the circulating light is above $L_1$, the amplification of the photoperiodic circuit 103 decreases, and while the amplification rate of the photoperiodic circuit 103 is above $L_2$, the intensity of the circulating light increases. As a result, as shown in FIG. 11A, the intensity of the circulating light repeatedly goes up and down, and does not stay constant at $L_1$.

In order to solve the problem described above, in the past, through negative feedback control of the amplification rate of the rare-earth-doped fiber 1, the intensity of the circulating light was held constant at $L_1$ as shown in FIG. 11A.

Below, this amplification control apparatus will be explained with reference to FIG. 12. As shown in the diagram, with this amplification control apparatus, excitation light is supplied to the rare-earth-doped fiber from a monitored excitation light source 13 through a wavelength multiplexing light mixer/divider 2. Then, the amplification rate of the ram-earth-doped fiber 1 is controlled by this excitation light and the excitation light which has passed through the rare-earth-doped fiber 1. The excitation light which passed through the rare-earth-doped fiber 1 is called leakage light.

Since a monitored excitation light source 13 is used as a light source for excitation light, an electrical signal proportional to file supplied excitation light is detected by the monitor output a. Simultaneously, since a wavelength multiplexing light mixer/divider 14 is provided, reversals in the photoperiodic circuit 104 due to leakage light are prevented. Additionally, the wavelength multiplexing light mixer/divider 14 outputs said leakage light to a light-receiving element 15. Thereby, an electrical signal proportional to the intensity of the leakage light of the rare-earth-doped fiber 1 is detected by the light-receiving element 15. Then, the division circuit 16 divides the electrical signal detected by the light-receiving element 15 by the electrical signal detected by the monitored excitation light source 13.

Additionally, the logarithmic amplification circuit 17 makes a logarithmic conversion of the results of the division due to the division circuit 16. This logarithmically convened value (that is, log [leakage light intensity/excitation light intensity]) is proportional to the amplification rate of the rare-earth-doped fiber 1. Furthermore, the logarithmic amplification circuit 17 reverses the positive/negative polarity of the logarithmically converted value. The addition circuit 18 adds the output of the logarithmic amplification circuit 17 to the output of the standard power source 19, and supplies the result to the monitored excitation light source 13. The monitored excitation light source 13 controls the intensity of the excitation light based on the output of the addition circuit 18. In this way, through negative feedback control of the output of the rare-earth-doped fiber 1, the conventional amplification control apparatus maintained the amplification rate of the photoperiodic circuit at "1".

FIG. 13 is a diagram showing the flow of the signal of the amplification control apparatus shown in FIG. 12. In the diagram, the arrow AR indicates the signal flow. Additionally, in this diagram, the symbols. (+) and (−) refer to the polarity of the signal. In order for this amplification control apparatus to operate normally, the response speed of the signal of the feedback route (arrow $AR_1$) entering the division circuit 16 from the monitor output a of the monitored excitation light source 13 and the response speed of the signal of the feedback route (arrow $AR_2$) entering the division circuit 16 from the light-receiving element 15 must be approximately equal. The following explanation assumes that the response speed of the signal of the feedback route arrow $AR_1$ and the response speed of the signal of the feedback route arrow $AR_2$.

It is assumed that a voltage having positive polarity is applied to an inputted electrode b of the addition circuit 18. The output of the addition circuit 18 increases, and as a result the output of the monitored excitation light source 13 also increases. Then, when the output of the monitored excitation light source 13 increases, the monitor output a increases. The monitor output a of the monitored excitation light source 13 is substituted into the divisor of the division made by the division circuit 16.

Simultaneously, the excitation light from the monitored excitation light source 13 inputted to the rare-earth-doped fiber 1 turns into excitation energy within the rare-earth-doped fiber 1. Then, as the excitation energy in the rare-earth-doped fiber 1 increases, the leakage light also increases. The increased leakage light is supplied to the light-receiving element 15 through the wavelength multiplexing light mixer/divider 14. Consequently, the output of the light-receiving element increases. This output of the light-receiving element 15 is inputted to the numerator side of the division circuit 16.

The division circuit 16 outputs an electrical signal indicating the value resulting from the division of the output of the light-receiving element 15 by the monitor output a of the monitored excitation light source 13. At this time, since the proportional increase in the output of the light-receiving element 15 becomes larger than the proportional increase in the monitor output a of the monitored excitation light source 13, the output of the division circuit 16 increases. The logarithmic amplification circuit 17 logarithmically converts the output of the division circuit 16. Furthermore, the logarithmic amplification circuit 17 reverses the polarity of the logarithmically converted value and outputs the result to the addition circuit 18. Therefore, if the output of the division circuit 16 increases, then the output of the logarithmic amplification circuit 17 decreases. As a result, a positive voltage is applied to the input electrode b of the addition circuit 18, and when the excitation light outputted by the monitored excitation light source 13 increases, a negative voltage is applied to the input electrode b of the addition circuit 18 by the above-mentioned negative feedback control.

If the circulation period of the circulating light is more than a few hundred microseconds, fluctuations in the intensity of the circulating light are somewhat suppressed by negative feedback control of the conventional amplification control apparatus. However, if the circulation period of the circulating light becomes any shorter, since the response speed of the above-described amplification control apparatus is slow, it becomes difficult to suppress fluctuations of the circulating light. The reason that the response speed of the above-described amplification control apparatus is slow will be explained below.

First, in order for the rare-earth-doped fiber 1 to function as an amplifier, it is necessary for the rare-earth elements within the rare-earth-doped fiber 1 to be in an excited state. Thus, when excitation light is injected into the rare-earth-doped fiber 1, the optical energy of this excitation light causes the rare-earth elements within the rare-earth-doped fiber 1 to become excited. However, from a few hundred microseconds to a few milliseconds are necessary for the rare-earth elements to reach an excited state after the excitation light is injected into the rare-earth-doped fiber 1. As a result, the change in the amplification rate of the rare-earth-doped fiber 1 trails the change in intensity of the excitation light.

FIG. 14 is a diagram showing the relationship between the modulation frequency of the excitation light and the variation in the amplification rate of the rare-earth-doped fiber 1 when the intensity of the excitation light is modulated by a sine wave. With the above-mentioned amplification control apparatus, if the electric circuit portion becomes high-speed, then the intensity of the circulating light fluctuates. Similarly, with the above-mentioned amplification control apparatus, if the amount of negative feedback is increased, then the intensity of the circulating light fluctuates. Consequently, it is not possible to sufficiently suppress fluctuations of the circulating light. The reason that the intensity of the circulating light fluctuates is given below.

FIG. 15A is a diagram showing the signal flow in the amplification control apparatus when the electric circuit portion is high-speed. In the diagram, the response speed of the feedback route $AR_1$ is significantly faster than the response speed of the feedback route $AR_2$. In this case, as seen in the FIG. 15A, because the route (arrow $AR_1$) described by addition circuit 18→monitored excitation light source 13→division circuit 16→logarithmic amplification circuit 17→addition circuit 18 operates as a positive feedback route, the intensity of the circulating light fluctuates. The reason is as follows.

In this case, it is assumed that a positive voltage is inputted to the input electrode b of the addition circuit 18. Then, the output value of the monitor output a of the monitored excitation light source 13 and the output value of the light-receiving element 15 are inputted to the division circuit 16. As mentioned above, the output value of the monitor output a is substituted into the divisor, and the output of the light-receiving element 15 is substituted into the numerator. At this time, since the amplification rate variation of the rare-earth-doped fiber 1 is gentle, the speed of increase of the leakage light is slow in comparison with the speed of increase of the output value of the monitor output a of the monitored excitation light source 13. As a result, the speed of increase of the output value of the light-receiving element 15 is slow in comparison with the speed of increase of the output value of the monitor output a of the monitored excitation light source 13.

Consequently, of the signals inputted to the division circuit 16, only the monitor output a of the monitored excitation light source 13 significantly increases. As a result, for the division carded out by the division circuit 16, since only the monitor output a of the monitored excitation light source 13 (the divisor in the division) significantly increases, the output of the division circuit 16 decreases. When the output of the division circuit 16 decreases, the output of the logarithmic amplification circuit 17 increases, and the positive voltage applied to the addition circuit also increases.. Therefore, when the electric circuit portion is made high-speed, the amplification control apparatus becomes a positive feedback system, and the intensity of the circulating light fluctuates.

FIG. 15B is a diagram showing the signal flow when the amount of feedback of the amplification control is increased. If the amount of feedback for negative feedback control is decreased, errors in the negative feedback route become rarer, and it is possible to suppress fluctuations of the circulating light. However, even in this case, the control operation may become unstable or the circulating light may fluctuate. This is because the signal of the feedback route (arrow $AR_2$) passing through the light-receiving element is delayed and the phase of the signal changes, and as a result, the feedback route passing through the light-receiving element becomes a positive feedback route.

In this case, when the signal variation is slow, the signal outputted by the light-receiving element 15 has a phase which trails that of the excitation light output of the monitored excitation light source 13 by 90 degrees. This is because the leakage light inputted to the light-receiving element 15 becomes the excitation energy stored in the rare-earth-doped earth-doped fiber 1. Thus, the output of the light-receiving element 15 becomes the value of the integral of the monitor output of the monitored excitation light source 13. When the signal variation becomes fast, the output of the light-receiving element 15 is delayed by the time it takes to complete the route (arrow $AR_2$) described by monitored excitation light source 13→wavelength multiplexing light mixer/divider 2→rare-earth-doped fiber 1→wavelength multiplexing light mixer/divider 14→light-receiving element 15. Therefore, when the operation speed is fast, the delay due to propagation time is added to the 90 degree phase delay due to the integration operation, and what was supposed to be a negative feedback control system becomes a positive feedback control system. If the amount of feedback is small, the feedback amplification factor for fast operation speeds becomes less than 1, and the intensity of the circulating light becomes stable. However, if the amount of feedback is large, then the feedback amplification factor for fast operation speeds increases, and if the feedback amplification factor for positive feedback becomes greater than 1, the intensity of the circulating light fluctuates.

As explained above, the conventional amplification control apparatus can stably perform negative feedback control as long as it is operating at a relatively slow speed. However, if the operation is made high-speed or the amount of feedback is increased, then the negative feedback control system of the amplification control apparatus changes to a positive feedback control system. As a result, with a conventional amplification control apparatus, if the response speed of the electrical circuit portion of the amplification control apparatus is made faster or the amount of negative feedback is increased, then the control of the amplification control apparatus becomes unstable, and the intensity of the circulating light fluctuates.

Additionally, as a different way to hold the intensity of the circulating light constant, a method whereby the intensity of the circulating light is measured and negative feedback is sent to the excitation light source itself may be considered. However, as seen in FIG. 11, because the change in the intensity of the circulating light is delayed in comparison with the amplification rate of the photoperiodic circuit, fluctuations of the circulating light are made worse by this type of simple negative feedback control (see FIG. 16).

The present invention was made in light of a background which suffered from these types of problems, and has as an objective the presentation of an amplification control apparatus for a photoperiodic circuit which is able to suppress fluctuations in the circulating light.

SUMMARY OF THE INVENTION

The object of the present invention is control the amplification rate of a photoperiodic circuit through stable negative feedback control even if the circulation period of the circulating light is short, thereby suppressing fluctuations in the intensity of the circulating light in the photoperiodic circuit.

The present invention comprises a photoperiodic circuit which is a circulatory optical path wherethrough an optical signal repeatedly circulates as circulating light, an amplification means, provided in said photoperiodic circuit, for amplifying the intensity of said circulating light with the use of excitation light for each circuit completed by said circulating light, a first holding means for holding an intensity value of said circulating light corresponding to a given circulation time, a second holding means for holding an intensity value of said circulating light corresponding to a circulation time different from the circulation time of said first holding means, a comparison means for comparing a value held by said first holding means with a value held by said second holding means, and a circulating light control means for controlling the intensity of said circulating light based on an output value of said comparison means.

With the present invention, when the circulating light completes a circuit of the photoperiodic circuit, the intensity of said circulating light at a given point in time is held by the first holding means. Additionally, the intensity of said circulating light for a point in time different from that of the first holding means is held by the second holding means. The values held by these two holding means are compared by the comparison means. Then, the circulating light-control means controls the intensity of the circulating light based on the amount of change in the intensity of the circulating light for the number of circuits completed.

With the present invention, since the intensity of the circulating light in the photoperiodic circuit is controlled based on the intensity of the circulating light for two points in time are held by the two holding means, even if the circulation period of the circulating light is short, it is possible to perform stable negative feedback control. As a result, fluctuations in the intensity of the circulating light of the photoperiodic circuit are able to be suppressed.

BRIEF DESCRIPTION OF THE DRAWINGS

FIG. 2A: A waveform diagram showing the output of the light-receiving element 21.

FIG. 2B: A waveform diagram showing the hold signal for the sample-and-hold circuit 23.

FIG. 2C: A waveform diagram showing the output of the sample-and-hold circuit 23.

FIG. 2D: A waveform diagram showing the hold signal for the sample-and-hold circuit 24.

FIG. 2E: A waveform diagram showing the output of the sample-and-hold circuit 24.

FIG. 2F: A waveform diagram showing the hold signal for the sample-and-hold circuit 25.

FIG. 2G: A waveform diagram showing the output of the sample-and-hold circuit 25.

FIG. 2H: A waveform diagram showing the excitation light output.

FIG. 2I: A waveform diagram showing the photoperiodic circuit amplification rate for Embodiment 1 of the present invention.

FIG. 3: A block diagram showing the composition of the photoperiodic circuit amplification control apparatus of Embodiment 2 of the present invention.

DETAILED DESCRIPTION OF THE PREFERRED EMBODIMENTS

Below, Embodiment 1 of the present invention will be explained with reference to the drawings.

§1. EMBODIMENT 1

Figure 1:
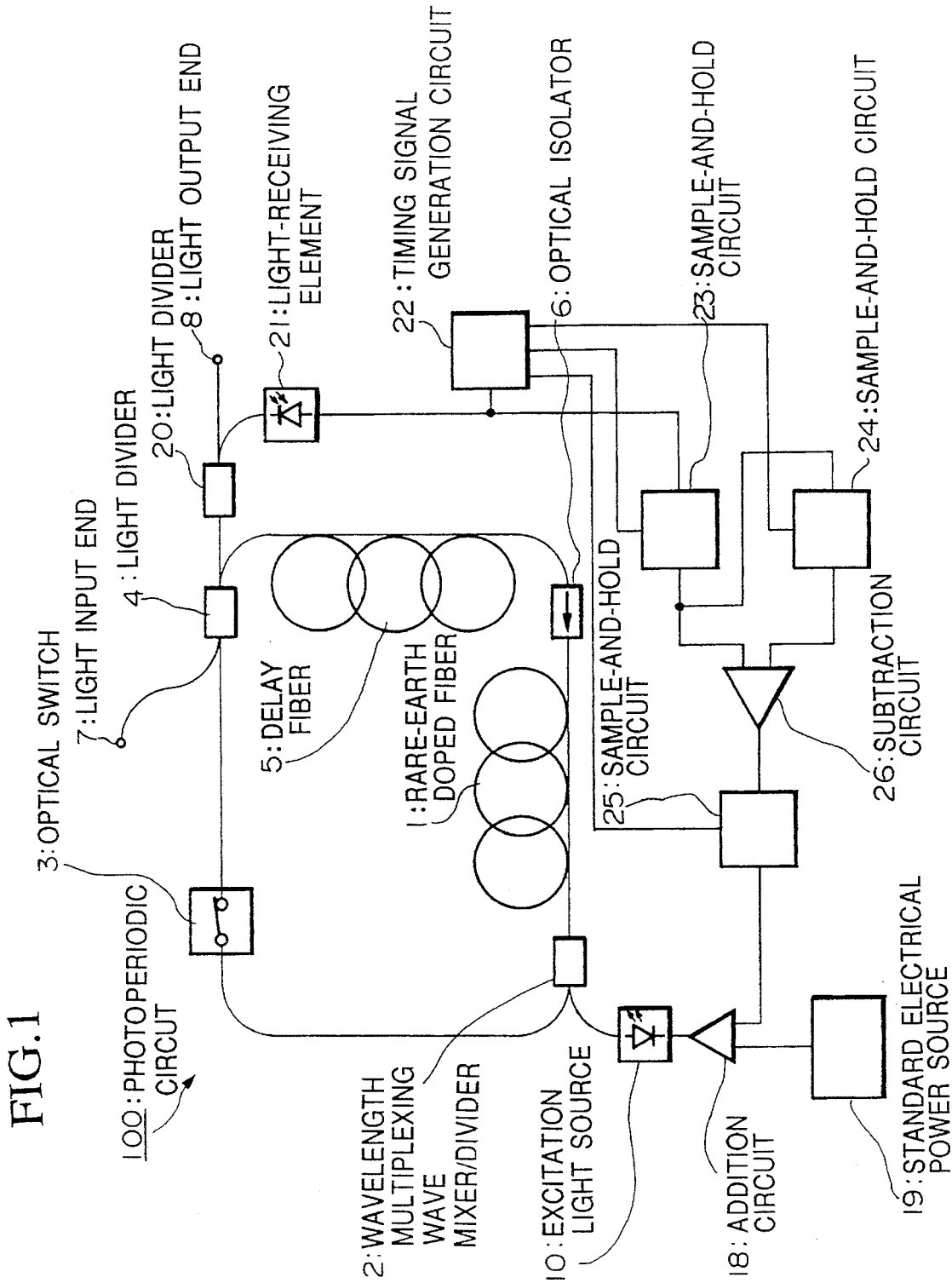
FIG. 1: A block diagram showing the composition of the photoperiodic circuit amplification control apparatus of Embodiment 1 of the present invention.
Figure 7:
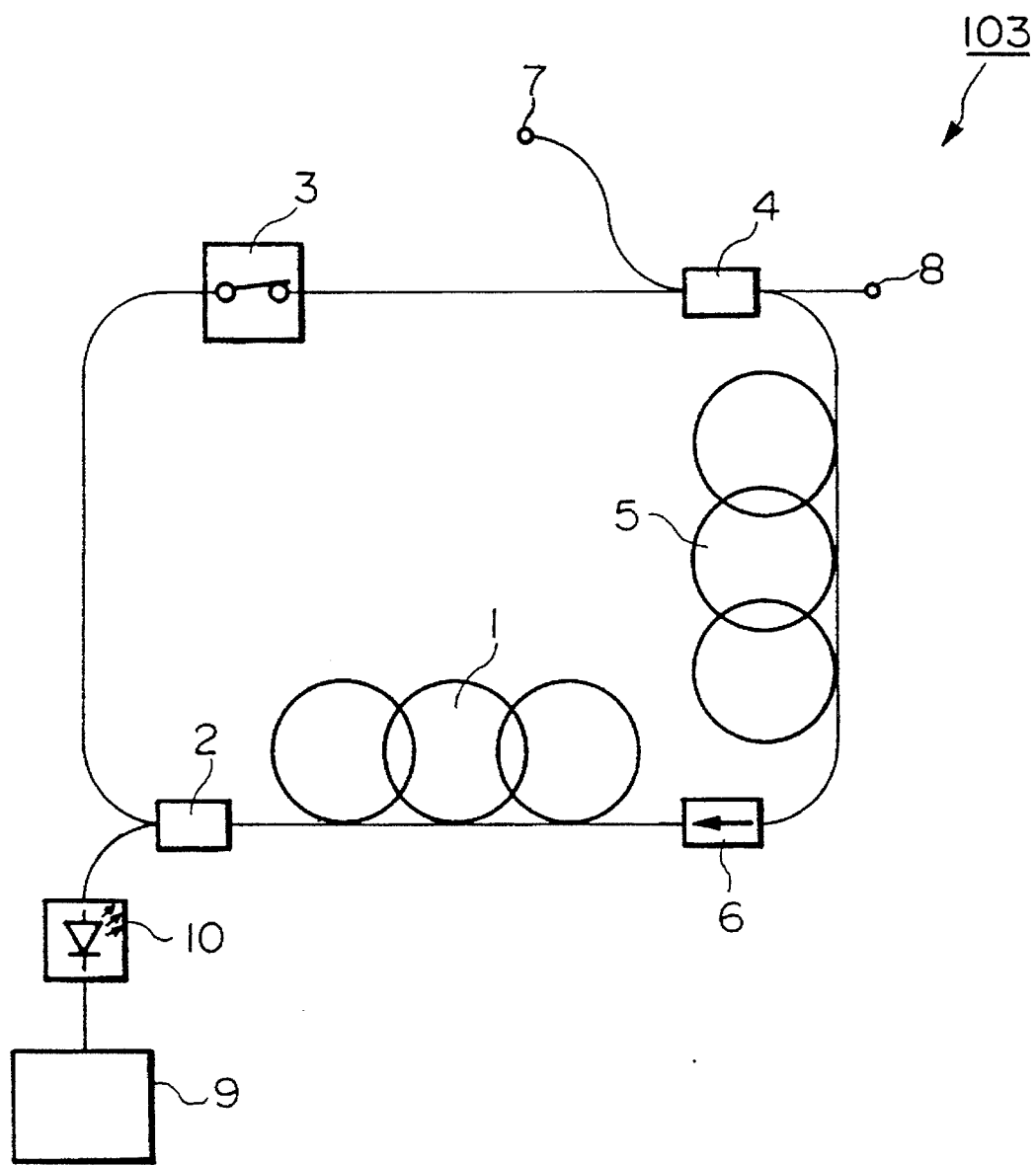
FIG. 7: A block diagram showing the composition of a photoperiodic circuit which excites the rare-earth-doped fiber 1 with excitation light of a constant intensity.
Figure 8:
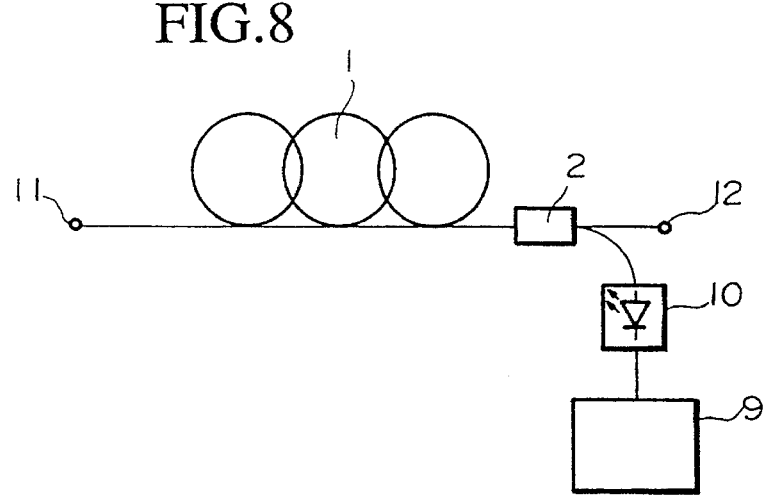
FIG. 8: A block diagram showing the composition of an optical amplifier which excites the rare-earth-doped fiber 1 with excitation light of a constant intensity.
Figure 9A:
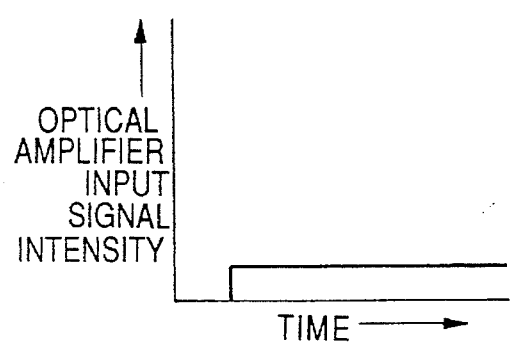
FIG. 9A: A waveform diagram showing the temporal change in the signal intensity of the input of the optical amplifier shown in FIG. 8.
Figure 9B:
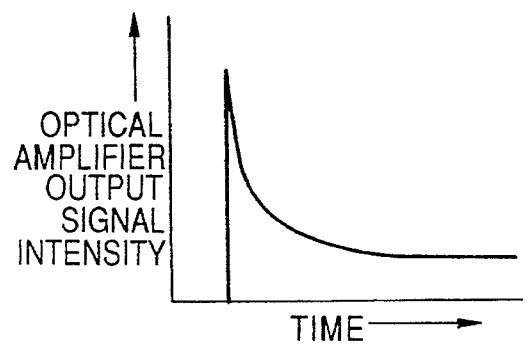
FIG. 9B: A waveform diagram showing the temporal change in the signal intensity of the output of the optical amplifier shown in FIG. 8.
Figure 10A:
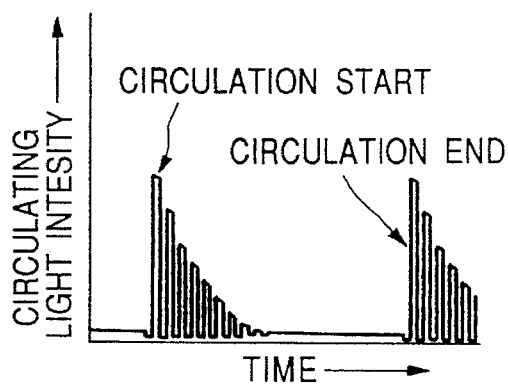
FIGS. 10A–10D: A waveform diagram showing the variation in the intensity of the circulating light in the photoperiodic circuit 103 shown in FIG. 7.
Figure 10B:
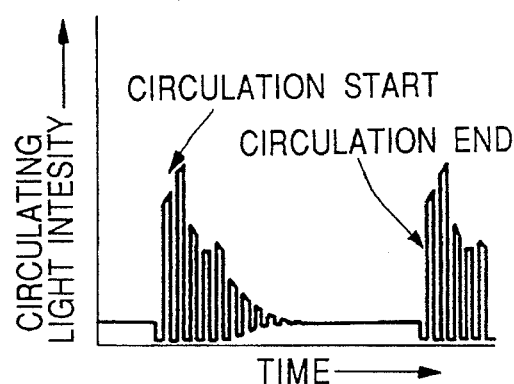
Figure 10C:
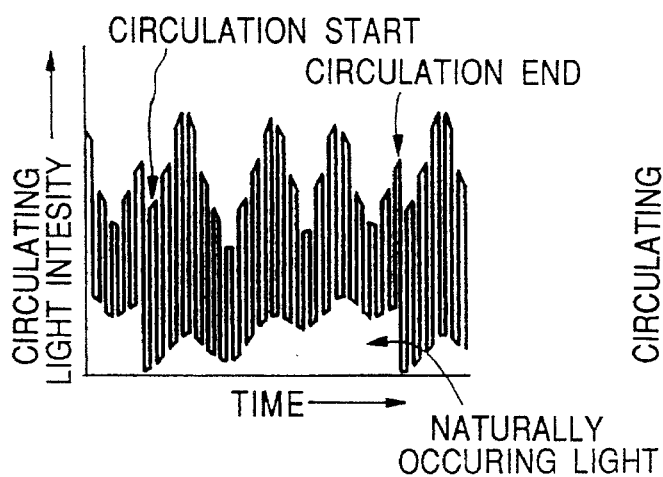
Figure 10D:
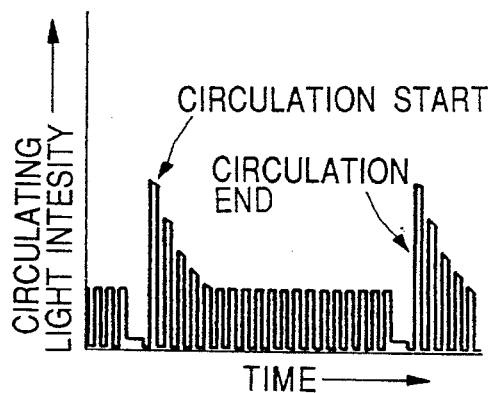
Figure 12:
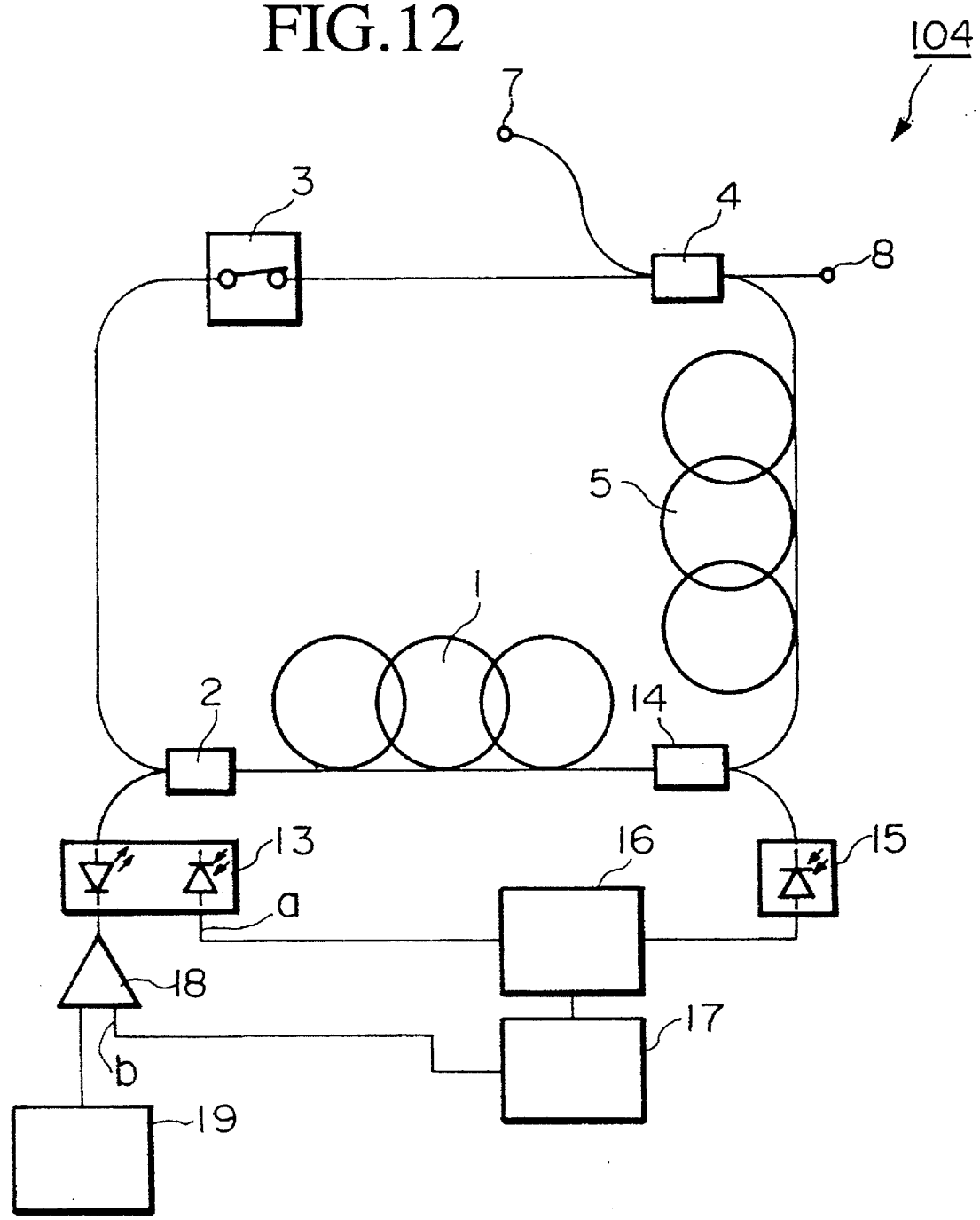
FIG. 12: A block diagram showing the composition of a conventional photoperiodic circuit amplification control apparatus.
Figure 13:
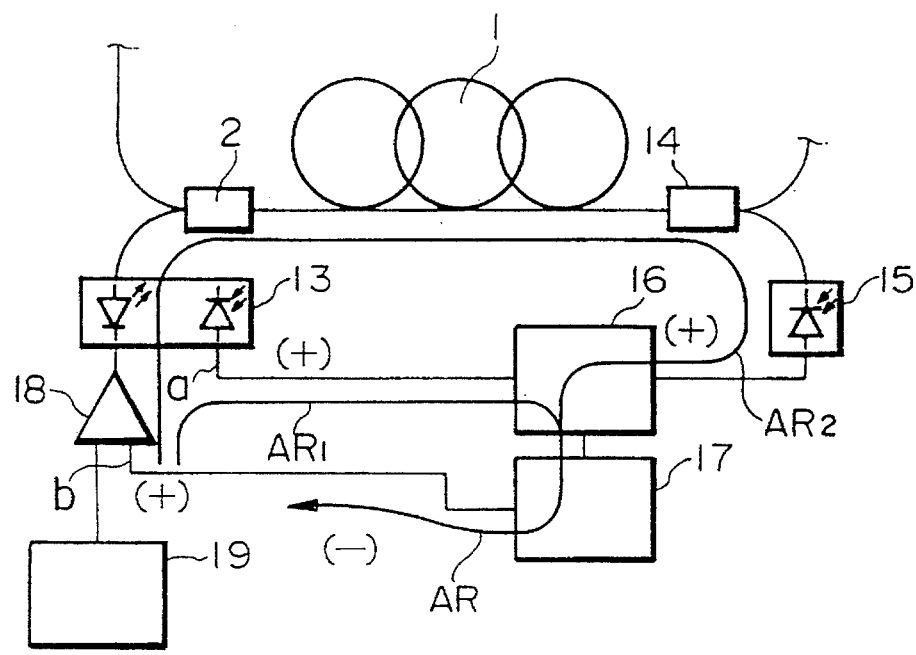
FIG. 13: A diagram showing the flow of the control signal for conventional negative feedback control.
Figure 14:
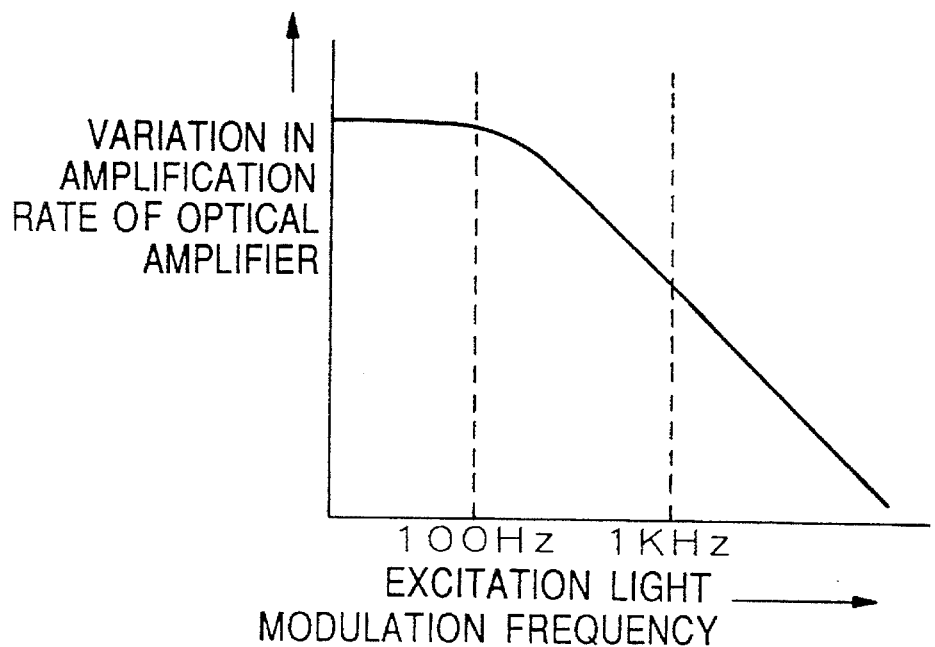
FIG. 14: A diagram showing amount of change in the amplification rate of the rare-earth-doped fiber 1 when the excitation light intensity of the rare-earth-doped fiber 1 is modulated by a sine wave.
Figure 15A:
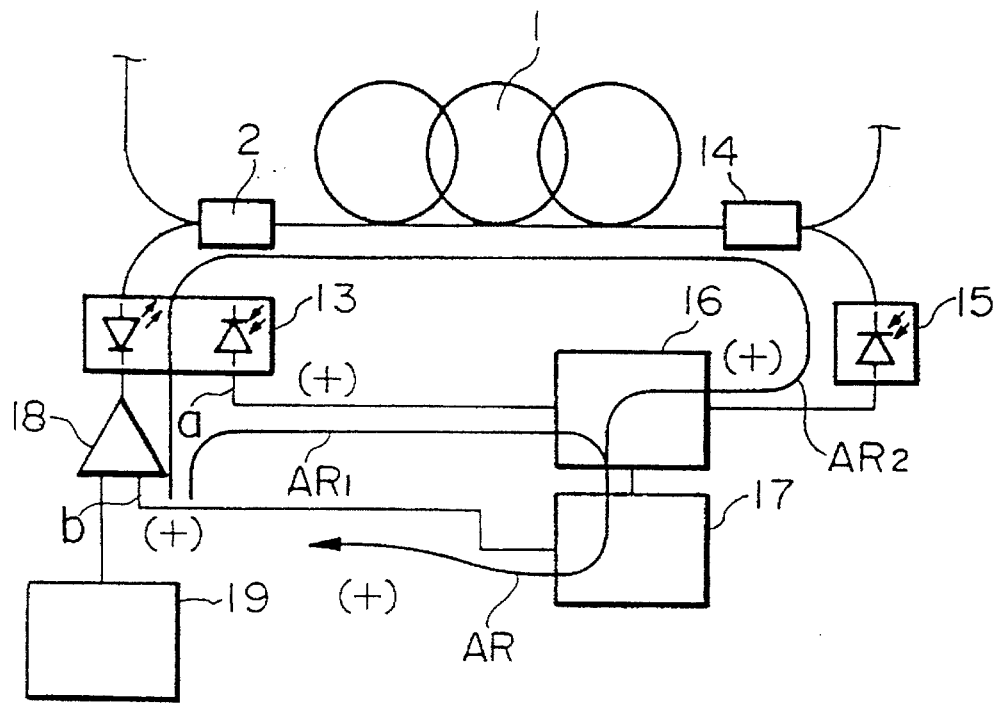
FIG. 15A: A diagram showing the flow of the control signal for conventional negative feedback control when the electrical circuit portion is made high-speed.
Figure 15B:
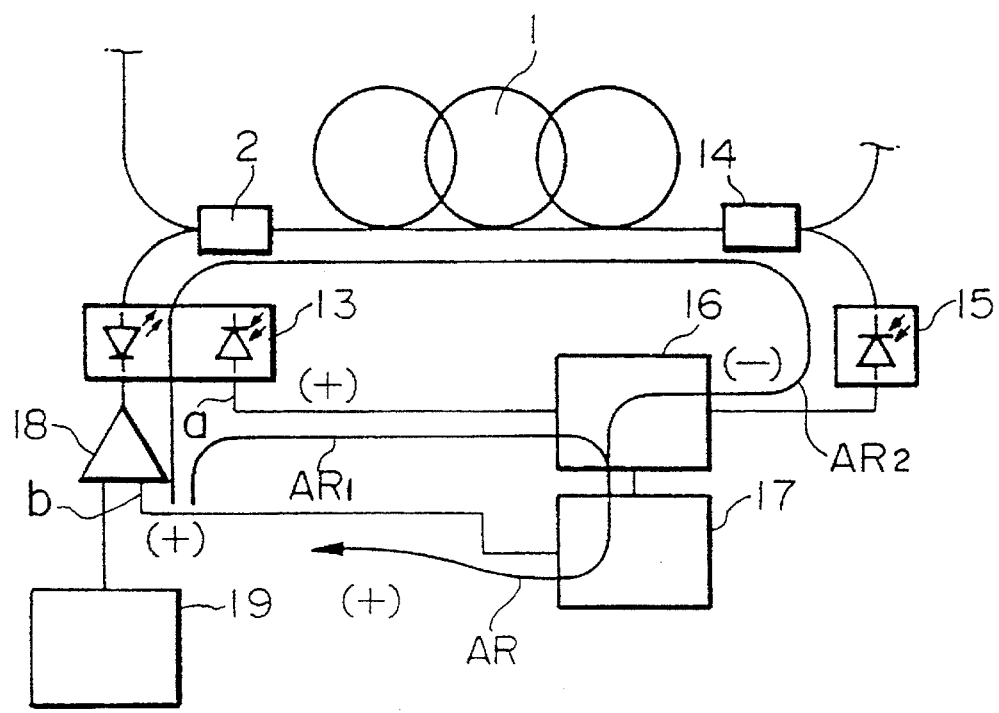
FIG. 15B: A diagram showing the flow of the control signal for conventional negative feedback control when the amount of negative feedback is increased.
Figure 16:
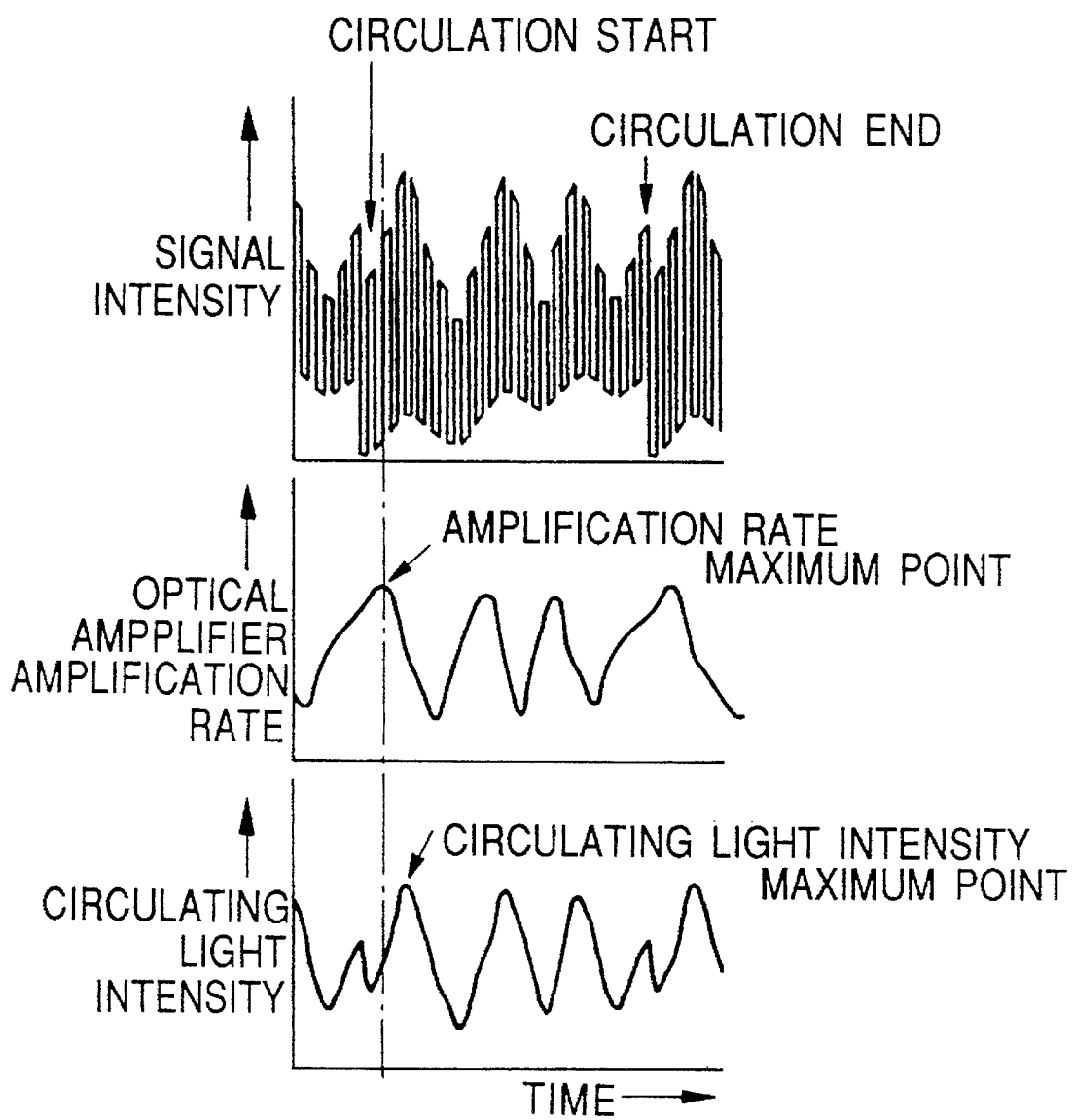
FIG. 16: A waveform diagram showing the relationship between the amplification rate of the optical amplifier and the intensity of the circulating light for a conventional photoperiodic circuit amplification control apparatus.

FIG. 1 is a block diagram showing the composition of the photoperiodic circuit amplification control apparatus according to Embodiment 1 of the present invention. In the diagram, the portions corresponding to parts already shown in FIGS. 7 and 12 are given identical reference numerals, and their explanations will be omitted.

The light divider 20 splits the optical signal output from the light divider 4. One portion of the optical signal split by the light divider 20 is outputted from the light output end 8, and the rest is sent to the light-receiving element 21. The light-receiving element 21 converts the inputted optical signal to an electrical signal (below, referred to as the circulating light intensity signal) indicating the intensity of the optical signal.

The timing signal generation circuit 22 generates a timing signal from said circulating light intensity signal which controls the action of the sample-and-hold circuits 23, 24 and 25. The sample-and-hold circuit 23 holds an electrical signal indicating the optical intensity of the presently circulating light. The sample-and-hold circuit 24 holds an electrical signal indicating the optical intensity of the circulating light of the previous circuit. The subtraction circuit 26 finds the difference between the output value of the sample-and-hold circuit 23 and the output value of the sample-and-hold circuit 24. The sample-and-hold circuit 25 holds the output of the subtraction circuit 26. This is to prevent changes in the output value of the subtraction circuit 26 for the addition circuit 18 while the values held in the sample-and-hold circuit 23 and the sample-and-hold circuit 24 are being renewed. The addition circuit 18 adds the output of the sample-and-hold circuit 25 to the output of the standard electrical power source circuit 19, and outputs the results to the excitation light source 10.

Next, the operation of the photoperiodic circuit amplification control apparatus according to the above-described composition will be explained. First, when the frame is started, an optical signal is inputted from the light input end 7. The pulse width of this optical signal is shorter than the time required for the optical signal to complete a circuit of the photoperiodic circuit 100. The optical signal passes through the delay fiber 5, the optical isolator 6, the rare-each-doped fiber 1, the wavelength multiplexing light mixer/divider 2 and the optical switch 3, then returns to the light divider 4. When the circulating light passes through each of the above-mentioned elements, the optical intensity of the circulating light is attenuated. However, the rare-earth-doped fiber 1 amplifies the optical intensity of the circulating light to the optical intensity which it had prior to the attenuation. Therefore, the intensity of the circulating light is maintained at approximately the same intensity as when it started to circulate, even after repeated circuits. A portion of the circulating light circulating through the photoperiodic circuit 100 is sent to the light divider 20 by the light divider 4. One portion of the circulating light sent to the light divider 20 is output through the light output end 8. Additionally, the rest of the circulating light sent to the light divider 20 is sent to the light-receiving element 21.

Figure 11A:
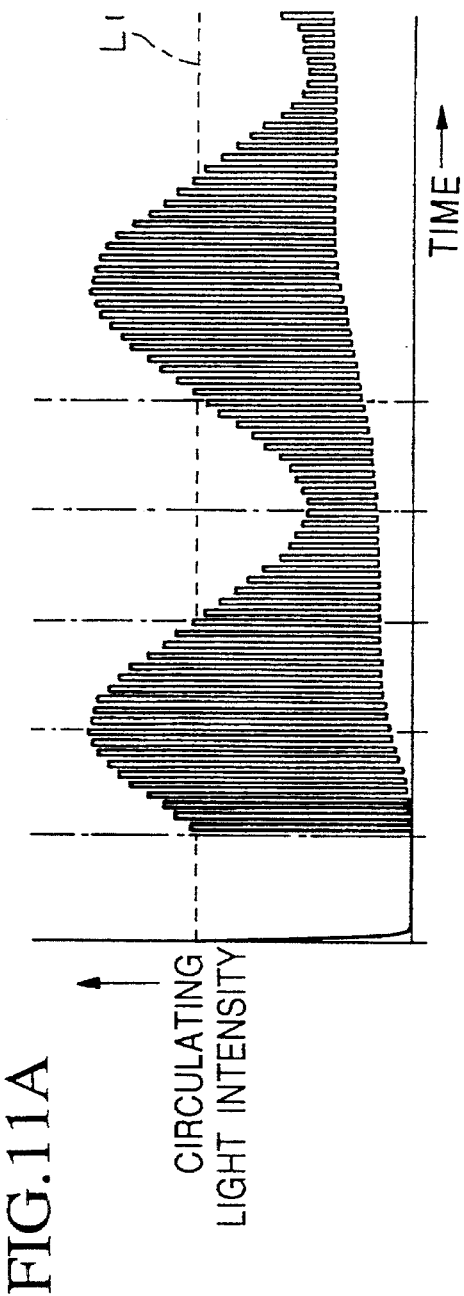
FIG. 11A: A waveform diagram showing the variation in the circulating light intensity for the photoperiodic circuit 103 shown in FIG. 7.
Figure 11B:
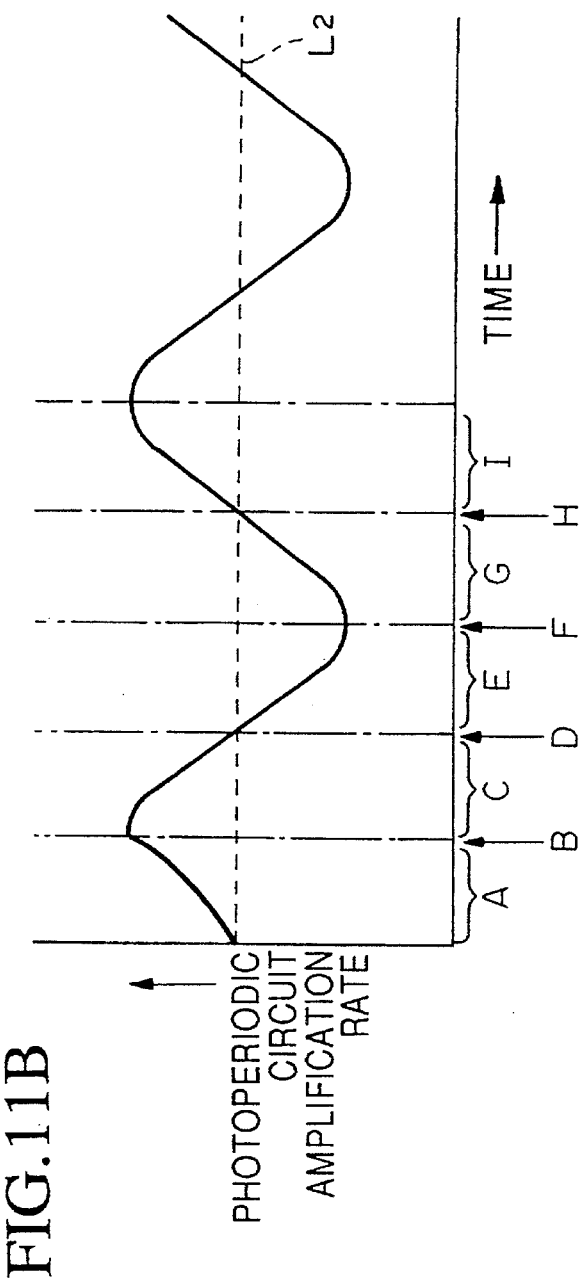
FIG. 11B: A waveform diagram showing the variation in the photoperiodic circuit amplification rate for the photoperiodic circuit 103 shown in FIG. 7.

Next, the negative feedback control carried out by the amplification control apparatus of the present invention will be explained. FIG. 2A is a waveform diagram showing the output of the light-receiving element 21. The output waveform of the light-receiving element 21 actually becomes the waveform shown in FIG. 11, but it is simplified for the purpose of explanation. FIG. 2B is a waveform diagram showing the hold signal supplied from the timing signal generation circuit 22 to the sample-and-hold circuit 23. FIG. 2C is a waveform diagram showing the signal held by the sample-and-hold circuit 23. FIG. 2D is a waveform diagram showing the hold signal supplied from the timing signal generation circuit 22 to the sample-and-hold circuit 24. FIG. 2E is a waveform diagram showing the signal held by the sample-and-hold circuit 24. FIG. 2F is a waveform diagram showing the hold signal supplied from the timing signal generation circuit 22 to the sample-and-hold circuit 25. FIG. 2G is a waveform diagram showing the signal held by the sample-and-hold circuit 25. FIG. 2H is a waveform diagram showing the variation in the excitation light output by the excitation light source 10. FIG. 2I is a waveform diagram showing the variation in the amplification rate of the photoperiodic circuit 100. In FIGS. 2A, 2C, 2E, 2G and 2H, the dotted line $L_2$ indicates the optical signal intensity when the amplification rate of the photoperiodic circuit is "1".

With regard to FIG. 1, first, an optical signal is inputted from the light input end 7, and a portion of the optical signal is supplied to the light-receiving element 21 through the light divider 4 and the light divider 20. The optical signal supplied to the light-receiving element 21 is converted to an electrical signal. Then, the light-receiving element 21 supplies the electrical signal to the timing signal generation circuit 22 and the sample-and-hold circuit 23. The above-mentioned electrical signal output by the light-receiving element 21 is taken as $S_1$ (see FIG. 2A). The electrical signal $S_1$ is held in the sample-and-hold circuit 23 (see FIG. 2C) according to the timing of the onset of the hold signal $H_{11}$ (see FIG. 2). Then, the electrical signal $S_1$ held in the sample-and-hold circuit 23 is output to the sample-and-hold circuit 24. This output of the sample-and-hold circuit 23 is held in the sample-and-hold circuit 24 (see FIG. 2E) according to the timing of the onset of the hold signal $H_{21}$.

Next, the circulating light which has completed a circuit of the photoperiodic circuit 100 is similarly supplied to the light-receiving element 21 through the light divider 4 and the light divider 20. The light-receiving element 21 converts the above-mentioned circulating light into an electrical signal and outputs the signal to the timing signal generation circuit 22 and the sample-and-hold circuit 23. At this time, the above-mentioned electrical signal output by the light-receiving element 21 is taken as $S_2$ (see FIG. 2A). The electrical signal $S_2$ is held by the sample-and-hold circuit 23 (see FIG. 2C) according to the timing of the onset of the hold signal $H_{12}$ (see FIG. 2B). As a result of the preceding actions, the sample-and-hold circuit 23 holds the electrical signal $S_2$ which indicates the intensity of the circulating light after the completion of a circuit of the photoperiodic circuit 100. Additionally, the sample-and-hold circuit 24 holds the electrical circuit $S_1$ which indicates the intensity of the optical signal before circulating in the photoperiodic circuit 100.

In this case, when the electrical signal $S_2$ is greater than the electrical signal $S_1$, the amplification rate of the photoperiodic circuit 100 is greater than "1". On the other hand, when the electrical signal $S_2$ is less than the electrical signal $S_2$, the amplification rate of the photoperiodic circuit 100 is less than "1". Additionally, when the electrical signal $S_1$ and the electrical signal $S_2$ are equal, the amplification rate of the photoperiodic circuit 100 is "1".

Next, the subtraction circuit 26 determines the difference between the output of the sample-and-hold circuit 23 and the output of the sample-and-hold circuit 24, and supplies the result to the sample-and-hold circuit 25 as the amplification rate of the photoperiodic circuit 100. At this time, since the hold timing of the sample-and-hold circuit 23 and the hold timing of the sample-and-hold circuit 24 are different, there is a time period during which the output of the subtraction circuit 26 is not equal to the amplification rate of the photoperiodic circuit 100. Therefore, the output $S_1-S_2$ of the subtraction circuit 26 is held in the sample-and-hold circuit 25 (see FIG. 2G) according to the timing of the onset of the hold signal $H_{31}$ (see FIG. 2F).

The addition circuit 18 adds the output of the sample-and-hold circuit 25 with the output of the standard electrical power source 19, and supplies the result to the excitation light source 10. The excitation light source 10 converts the output of the addition circuit 18 from an electrical signal to an optical signal (excitation light), and supplies the signal to the rare-each-doped fiber 1 through file wavelength multiplexing light mixer/divider 2. The rare-earth-doped fiber 1 converts the excitation light into excitation energy. The rare-earth-doped fiber 1 uses the excitation energy to amplify the circulating light.

As described above, the excitation light is generated by the addition circuit 18 as the result of the addition of the output of the standard electrical power source 19 and the output of the sample-and-hold circuit 25. Therefore, when the intensity of the circulating light after one completed circuit is greater than the intensity of the optical signal prior to circulation, the output of the sample-and-hold circuit 25 is negative (see FIG. 2G). In this case, the excitation light input to the rare-each-doped fiber 1 becomes less than $L_3$ (see FIG. 2H). When the excitation light is less than $L_3$, the amplification rate of the photoperiodic circuit 100 decreases (see FIG. 2I).

Then, the electrical signal $S_2$ held by the sample-and-hold circuit 23 is supplied to the sample-and-hold circuit 24. The sample-and-hold circuit 24 is held by the electrical signal $S_2$ according to the timing of the onset of the hold signal $H_{22}$ (see FIG. 2D). Next, the circulating light which has completed two circuits of the photoperiodic circuit is supplied to the light-receiving element 21 through the light divider 4 and the light divider 20. The light-receiving element 21 converts the circulating light into an electrical signal and outputs the signal to the timing signal generation circuit 22 and the sample-and-hold circuit 23. At this time, the electrical signal output by the light-receiving element 21 is taken as $S_3$ (see FIG. 2A).

The above-mentioned electrical signal $S_3$ is held in the sample-and-hold circuit 23 (see FIG. 2C) according to the timing of the onset of the hold signal $H_{13}$ (see FIG. 2B). Then, the subtraction circuit 26 determines the difference $S_2-S_3$ between the electrical signal $S_3$ held by the sample-and-hold circuit 23 (the intensity of the circulating light after two circuits) and the electrical signal $S_2$ held by the sample-and-hold circuit 24 (the intensity of the circulating light after one circuit). The sample-and-hold circuit 25 holds the above-mentioned difference $S_{2-S3}$ according to the timing of the onset of the hold signal $H_{32}$ (see FIG. 2F).

Then, as described above, the addition circuit 18 adds the output of the standard electrical power source 19 and the output of the sample-and-hold circuit 25, and outputs the result to the excitation light source 10. The excitation light source 10 supplies excitation light proportional to the results of the above addition to the rare-earth-doped fiber 1 through the wavelength multiplexing light mixer/divider 2. In this way, the sample-and-hold circuit 25 holds a value indicating the latest amplification rate of the photoperiodic circuit according to the presently circulating light and the circulating light of the previous circuit. The addition circuit 18 performs amplification control of the photoperiodic circuit 100 based on the above-mentioned latest amplification rate.

As mentioned above, with the amplification control apparatus of the present embodiment, the optical intensity of the presently circulating light, the optical intensity of the circulating light of the previous circuit and the difference between the two above-mentioned optical intensities are held in sample-and-hold circuits, so the feedback control system is separated temporally. Consequently, even if the amount of feedback is increased, fluctuations in the intensity of the circulating light due to positive feedback may be avoided. As a result, it is possible to increase the amount of feedback and practicalize stable amplification control for a photoperiodic circuit.

§2. EMBODIMENT 2

FIG. 3 is a block diagram showing the composition of the photoperiodic circuit amplification control apparatus of Embodiment 2 of the present invention. In the diagram, the parts which are identical to the parts in FIG. 1 are given the same reference numerals, and their explanation will be omitted. With Embodiment 2 shown in FIG. 3, an optical attenuator 27 is provided between the wavelength multiplexing light mixer/divider 2 and the optical switch 3. The optical attenuator 27 attenuates the circulating light in the photoperiodic circuit 101. At this time, the contents held in the sample-and-hold circuit 25 are supplied to the optical attenuator 27. The optical attenuator 27 varies the attenuation rate of the circulating light according to the electrical signal of the sample-and-hold circuit 25.

Additionally, the excitation light: source 10 is driven by the excitation light source drive circuit 9. In Embodiment 2 shown by FIG. 3, the intensity of the excitation light output by the excitation light source 10 is held constant. Consequently, the rare-earth-doped fiber 1 is excited by excitation light of a constant intensity. Then, the optical attenuator 10 controls the amplification rate of the photoperiodic circuit 101. The method whereby the negative feedback control signal supplied to the optical attenuator 27 is generated is identical to the method of Embodiment 1. There are optical amplifiers 27 with fast response speeds, so with the amplification control apparatus of Embodiment 2, it is possible to control fluctuations in the circulating light faster than with the amplification control apparatus of Embodiment 1.

§3. EMBODIMENT 3

Figure 4:
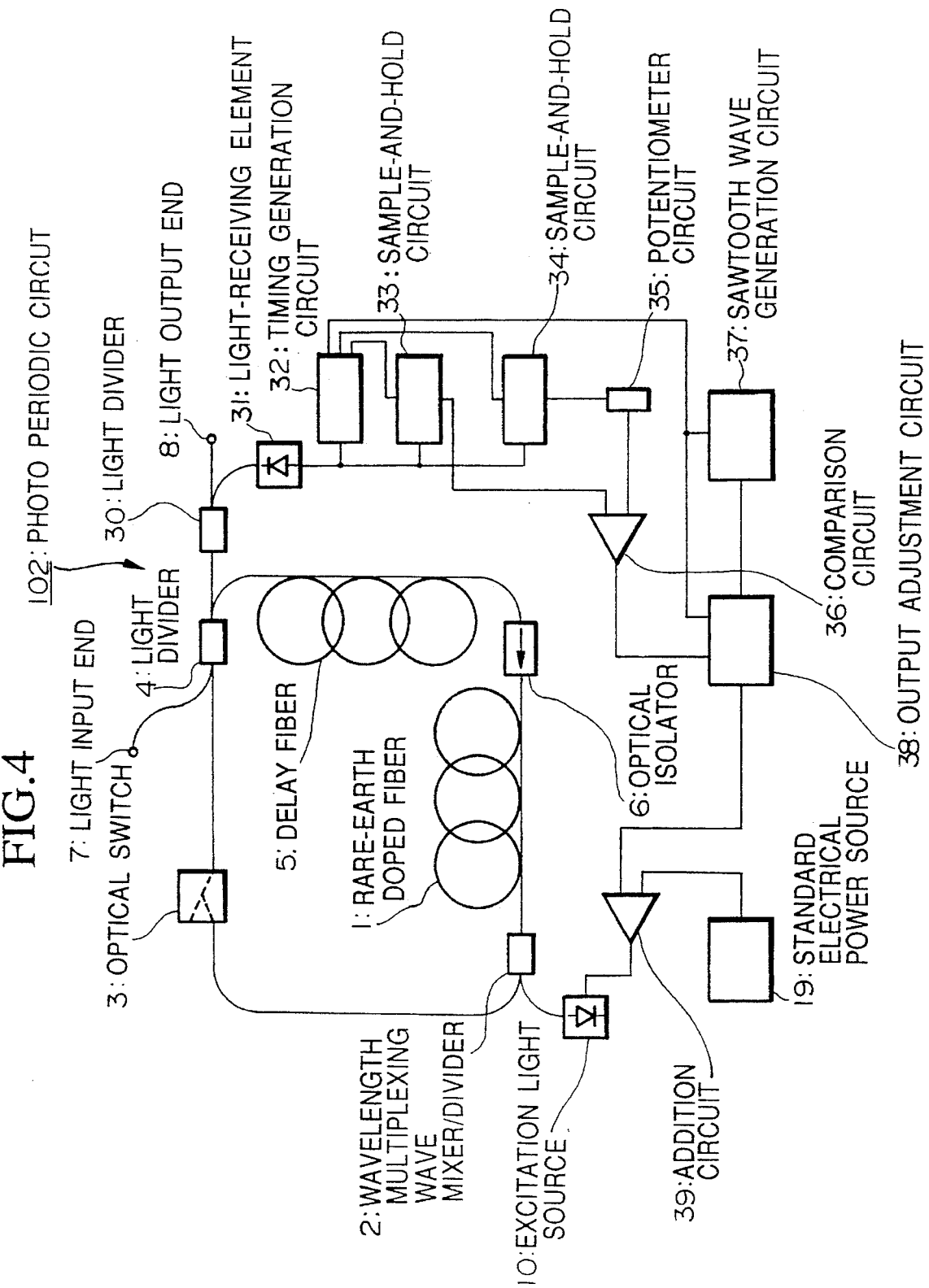
FIG. 4: A block diagram showing the composition of the photoperiodic circuit amplification control apparatus of Embodiment 3 of the present invention.

FIG. 4 is a block diagram showing the composition of the photoperiodic circuit amplification control apparatus according to Embodiment 3 of the present invention. In the drawing, the portions which correspond to portions in FIG. 1 are given the same reference numerals, and their explanation is omitted. In FIG. 4, the light divider 4 allows the circulation of the circulating light, and outputs a portion of the circulating light to the light divider 30. The light divider 30 splits the light inputted from the light divider 4. Additionally, the light divider 30 outputs a portion of the divided light to the light output end 8 and outputs the rest of the light to the light-receiving element 31.

The sample-and-hold circuit 33 holds the initial intensity of the circulating light. the sample-and-hold circuit 34 holds the final intensity of the circulating light after completing several circuits. The sampling rate of the sample-and-hold circuit 34 is determined by the period of the mildly fluctuating waveform of the circulating light. This sampling rate is generally in the range of a few hundred microseconds to a millisecond. As the circulating light repeatedly circulates, naturally emitted light is integrated. The potentiometer circuit 35 removes the increasing part of the above-mentioned naturally emitted light from the output light of the sample-and-hold circuit 34. That is, if the ratio of the initial amplitude to the desired amplitude for sampling of the sample-and-hold circuit 34 (the amplitude when mild fluctuations are not generated) is 1: N, then the potentiometer circuit 35 divides the output of the sample-and-hold circuit 34 by N.

The comparison circuit 36 compares the output of the sample-and-hold circuit 33 with the output of the sample-and-hold circuit 34. The output value of this comparison circuit 36 indicates whether the intensity of the circulating light is increasing or decreasing for each circuit completed. That is, the output value of the comparison circuit 36 indicates whether the amplification rate of the photoperiodic circuit is greater than or less than "1". The sawtooth wave generation circuit 737 generates a sawtooth wave based on a timing signal explained below. The output adjustment circuit 38 controls and outputs the output value of the sawtooth wave generation circuit 37 based on the output of the comparison circuit 36. At this time, then AC component of the signal output by the output adjustment circuit 18 is sent to the addition circuit 39. The standard power source circuit 19 generates a DC signal. The addition circuit 39 adds the output value of the output adjustment circuit 18 and the output value of the standard power source circuit 19. The result of the addition of the addition circuit 39 is supplied to the excitation light source 10 as a drive signal for the excitation light source 10. Additionally, with the present embodiment, an ordinary excitation light source 10 is used as the light source for injecting excitation light.

The timing generation circuit 32 generates timing signals for controlling the sawtooth wave generation circuit 37, the output adjustment circuit 38, the sample-and-hold circuit 33 and the sample-and-hold circuit 34 respectively based on the ending time of the circuit of the previous frame.

In this case, a frame is the time interval from the time at which the circulating light begins to circulate and the time at which the circulating light ends circulating and the next circuit begins. After the circulating light completes a predetermined number of circuits of the photoperiodic circuit, the circulation ends when the photoperiodic circuit is cut off by the action of the optical switch 3.

Figure 5A:
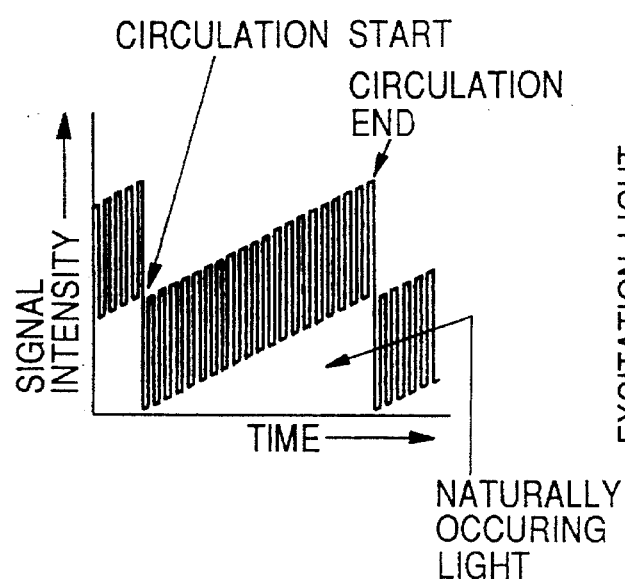
FIG. 5A: A waveform diagram describing the circulating light.
Figure 5B:
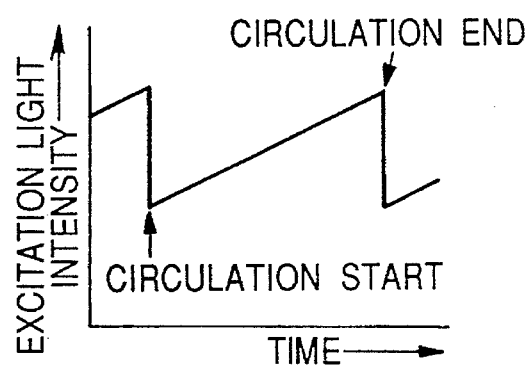
FIG. 5B: A waveform diagram describing the drive signal of the excitation light source 3.

Next, the activity of the photoperiodic circuit amplification control apparatus according to the above-described composition will be explained with reference to the graphs shown in FIGS. 5 and 6. FIG. 5A is a waveform diagram showing the waveform of circulating light when no mild fluctuations arise. FIG. 5B is a waveform diagram showing the drive signal for the excitation light source in this case. In this way, because of changes in the excitation light injected into the rare-earth-doped fiber 1 based on a signal wherein a constant offset voltage is added to a sawtooth wave having a given incline (see FIG. 5B), a waveform as shown in FIG. 5A is formed. The above-mentioned offset voltage is supplied from the standard power source circuit 19. Additionally, the sawtooth wave output from the output adjustment circuit 38 has its center at 0 V, and changes symmetrically with respect to its positive and negative sides.

Figure 5C:
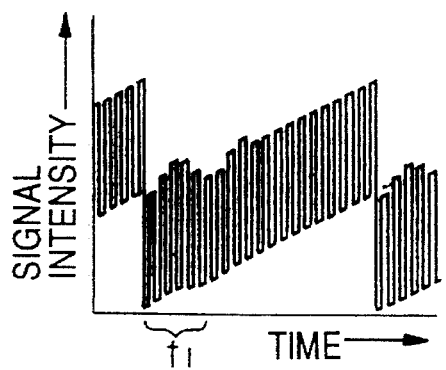
FIG. 5C: A waveform diagram describing the circulating light for Embodiment 3.
Figure 5D:
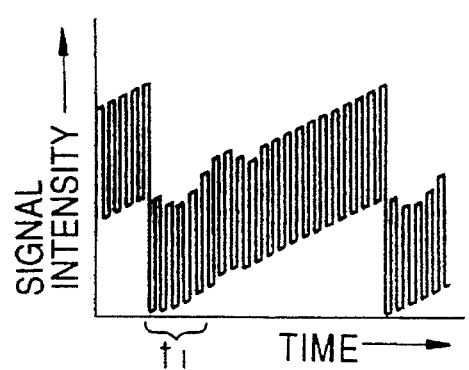
FIG. 5D: A waveform diagram describing the circulating light for Embodiment 3.
Figure 6:
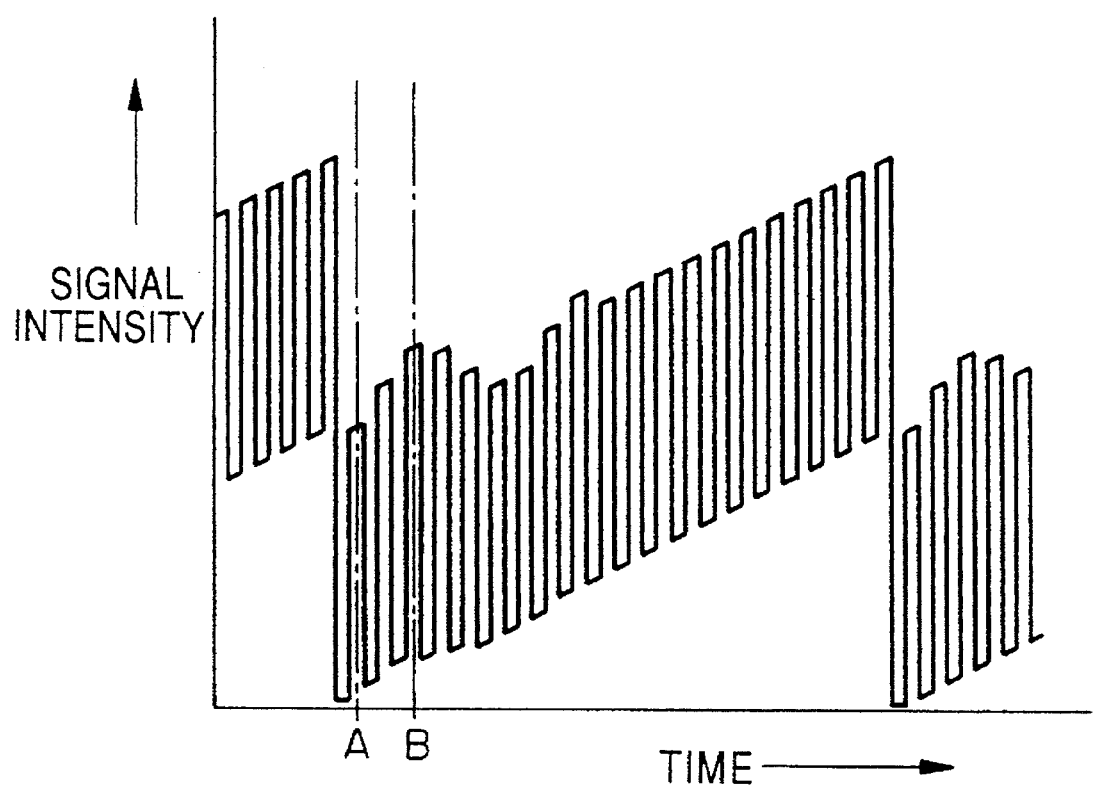
FIG. 6: A waveform diagram explaining the sampling times A and B for the same embodiment.

In this case, more than in the case in which a waveform such as shown in FIG. 5A is formed, when the sawtooth waves have a small inclination, mild fluctuations arise in the direction in which the intensity of the circulating light increases at the beginning of a frame (time $t_1$), that is, so as to form a peak (see FIG. 5C). In contrast, when the inclination of the sawtooth wave is large, then mild fluctuations arise in the direction in which the intensity of the circulating light decreases at the beginning of a frame, so as to form a trough (see FIG. 5D). Consequently, the photoperiodic circuit amplification control apparatus according to this embodiment performs negative feedback control of the photoperiodic circuit 102 by detecting changes in the mild fluctuations at the beginning of a frame from the intensity of the circulating light at time A (frame start time) and time B (several circuits after the frame start time) as shown in FIG. 6.

Initially, when a frame begins, a 5rectangular optical signal is input through the light input end 7. This optical signal becomes circulating light, passes through the delay fiber 5, the optical isolator 6, the me-earth-doped fiber 1, the wavelength multiplexing light mixer/divider 2 and the optical switch 3 in succession, then returns to the light divider 4. The optical intensity of the circulating light is attenuated upon passage through each of the above-mentioned elements. However, since the rare-earth-doped fiber 1 amplifies the optical intensity of the circulating light to the level prior to attenuation, even after repeated circuits, the optical intensity of the circulating light passing through the light divider 4 is maintained at approximately the same value as when the light began to circulate. A portion of this circulating light is sent to the light divider 30 by the light divider 4. A portion of the circulating light sent to the light divider 30 is output from the light output end 8, and the rest is output to the light-receiving element 31.

Additionally, at this frame start time, a sawtooth wave begins to be generated by the sawtooth generation circuit 37. Time A shown in FIG. 6 is the time at which a rectangular wave of the circulating light of the first circuit is inputted to the sample-and-hold circuit 33. At time A in FIG. 6, a timing signal is supplied from the timing generation circuit 32 to the sample-and-hold circuit 33. In this way, the sample-and-hold circuit 33 holds a voltage indicating the optical intensity of the circulating light of the first circuit. Additionally, time B shown in FIG. 6 is the time at which the circulating light after several circuits is inputted to the sample-and-hold circuit 34. At time B in FIG. 6, a timing signal is supplied from the timing generation circuit 32 to the sample-and-hold circuit 34. In this way, the sample-and-hold circuit 34 holds a voltage indicating the optical intensity of the circulating fight after several circuits. The output of the sample-and-hold circuit 34 is divided by the potentiometer circuit 35. The output of the potentiometer circuit 35 is supplied to the comparison circuit 36. The comparison circuit 36 compares the output value of the potentiometer circuit with the output value of the sample-and-hold circuit 33.

Next, after the circulating light has made a given number of circuits of the photoperiodic circuit 102, the photoperiodic circuit 102 is cut off by the optical switch 3, and the timing generation circuit 32 supplies a timing signal to the output adjustment circuit 38. For this timing signal, the output adjustment circuit 38 determines whether the mild fluctuations are peaks as shown in FIG. 5C or troughs as shown in FIG. 5D based on the output value of the comparison circuit 36. According to the result, the output adjustment circuit 38 changes the inclination of the sawtooth wave supplied from the sawtooth wave generation circuit 37, then outputs the sawtooth wave to the addition circuit 39. Simultaneously, the timing generation circuit 32 supplies a timing signal to the sawtooth wave generation circuit 37. This timing generation circuit 32 maintains the supply of the timing signal to the sawtooth wave generation circuit 37 until the next frame begins to circulate. When the sawtooth wave generation circuit 37 receives the timing signal, the initial conditions are created. Then, when the next frame starts, the timing generation circuit 32 halts the supply of the timing signal to the sawtooth wave generation circuit 37. Then, the sawtooth generation circuit 37 begins the generation of another sawtooth wave.

A waveform in which mild fluctuations do not arise (see FIG. 5A) is formed by repeating, for each frame, the output adjustment operation of the output adjustment circuit 38 as explained above. Therefore, once a waveform without mild fluctuations is formed, the output adjustment circuit 38 controls the amplification rate of the photoperiodic circuit 102 even for minor changes in the circulating light, and a waveform as shown in FIG. 5A is maintained.

We claim:

1. A photoperiodic circuit amplification control apparatus comprising a photoperiodic circuit which is a circulatory optical path wherethrough an optical signal repeatedly circulates as circulating light;

an amplification means, provided in said photoperiodic circuit, for amplifying the intensity of said circulating light with the use of excitation light for each circuit completed by said circulating light;

a first holding means for holding an intensity value of said circulating light corresponding to a given circulation time;

a second holding means for holding an intensity value of said circulating light corresponding to a circulation time different from the circulation time of said first holding means;

a comparison means for comparing a value held by said first holding means with a value held by said second holding means; and a circulating light control means for controlling the intensity of said circulating light based on an output value of said comparison means.

2. The photoperiodic circuit amplification control apparatus according to claim 1, wherein said first holding means is a sample-and-hold circuit for holding an intensity value of presently circulating light for each circuit of said circulating light; and said second holding means is a sample-and-hold circuit for holding an intensity value of circulating light of the previous circuit for each circuit of said circulating light.

3. The photoperiodic circuit amplification control apparatus according to either claim 1 or 2, wherein said circulating light control means is an excitation light generation portion which supplies excitation light to said amplification means in response to intensity changes in said circulating light based on an output value of said comparison means.

4. The photoperiodic circuit amplification control apparatus according to either claim 1 or 2, wherein said circulating light control means is an optical attenuator which attenuates the intensity of said circulating light in response to intensity changes in said circulating light based on an output value of said comparison means.

5. A photoperiodic circuit amplification control apparatus according to claim 1, wherein said first holding means is a sample-and-hold circuit for holding an intensity value of circulating light at a starting time of circulation of said circulating light in said photoperiodic circuit; and said second holding means is a sample-and-hold circuit for holding an intensity value of circulating light after a given number of circuits of said circulating light in said photoperiodic circuit.

6. The photoperiodic circuit amplification control apparatus according to either claim 1 or 5, wherein said circulating light control means comprises a sawtooth wave generation means for generating sawtooth waves when said circulating light begins to circulate;

a sawtooth wave control means for controlling the inclination of sawtooth waves generated by said sawtooth wave generation means in response to intensity changes of said circulating light based an output value of said comparison means; and an excitation light generation means for supplying excitation light to said amplification means based on the sawtooth waves whereof the inclination is controlled by said sawtooth wave control means.

7. The photoperiodic circuit amplification control apparatus according to claims 1, 2 or 5, wherein said comparison means is a subtraction circuit for determining a difference between a value held by said first holding means and a value held by said second holding means.

8. The photoperiodic circuit amplification control apparatus according to claim 3, wherein said comparison means is a subtraction circuit for determining a difference between a value held by said first holding means and a value held by said second holding means.

9. The photoperiodic circuit amplification control apparatus according to claim 4, wherein said comparison means is a subtraction circuit for determining a difference between a value held by said first holding; means and a value held by said second holding means.

10. The photoperiodic circuit amplification control apparatus according to claim 6, wherein said comparison means is a subtraction circuit for determining a difference between a value held by said first holding means and a value held by said second holding means.

* * * * *